(12) United States Patent
Trujillo (10) Patent No.: US 6,477,962 B2
(45) Date of Patent: Nov. 12, 2002

(54) TRACK SYSTEM FOR AIRPLANE SERVING CARTS

(76) Inventor: Thomas A. Trujillo, 3001 Tanglewood Dr., Anchorage, AK (US) 99517

( * ) Notice: Subject to any disclaimer, the term of this patent is extended or adjusted under 35 U.S.C. 154(b) by 0 days.

(21) Appl. No.: 09/780,743

(22) Filed: Feb. 9, 2001

(65) Prior Publication Data

US 2002/0108529 A1 Aug. 15, 2002

(51) Int. Cl.[7] .............................................. B60M 1/34
(52) U.S. Cl. ................................... 104/140; 104/94
(58) Field of Search ........................... 104/94, 96, 88, 104/103, 139, 140

(56) References Cited

U.S. PATENT DOCUMENTS 3,179,208 A * 4/1965 Umanoff ..................... 186/46
4,532,385 A * 7/1985 Friske ........................ 191/23 A
5,205,515 A * 4/1993 Luria ........................ 244/118.5

* cited by examiner

*Primary Examiner*—S. Joseph Morano
*Assistant Examiner*—Robert J. McCarry, Jr.
(74) *Attorney, Agent, or Firm*—Michael J. Tavella

(57) ABSTRACT

A system to control the movement of carts in an airplane. It has a set of tracks in which a set of roller wheels is placed. The roller wheels are attached to the bottom of a typical cart. A releasable locking system is used to control the cart as before. In one embodiment, the system has a cart release mechanism to remove it from the tracks for servicing and storage. The system uses a "pop-up" ramp that is embedded in the bottom of the track at specific locations. At these locations, the top of the track is large enough to allow the wheels to pass out of the track. Thus, to remove the cart, the ramps are deployed and the cart is pushed up the ramps until all four wheels have come out of the track.

15 Claims, 9 Drawing Sheets

TRACK SYSTEM FOR AIRPLANE SERVING CARTS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to track systems for airplane serving carts, and particularly to under-floor mounted track system for airplane serving carts.

2. Description of the Prior Art

Airplane service has evolved into an assembly line style of service where meals and drinks are served in wheeled carts. Flight attendants push the carts in the aisles that run through the length of a typical airplane. The carts have a locking system for the wheels so that the cart can be secured for servicing each row in the plane. Although this system works well, it has problems. The carts are not secured in any way to the aisle. Thus, carts can and do get away from the flight attendants. These loose carts can cause injury to the passengers and to the plane itself. Moreover, it times of severe turbulence, it is possible for the carts to become airborne because there is nothing holding them down. Obviously, such a situation is dangerous to the passengers and crew.

BRIEF SUMMARY OF THE INVENTION

To correct these problems, a system has been designed to better control the movement of carts in the plane. It has a set of tracks in which a set of roller wheels is placed. The roller wheels are attached to the bottom of a typical cart. A releasable locking system is used to control the cart as before. By using the tracks, the safety of the passengers has been improved. If the cart should get away from the crew, it cannot tip over or crash into passengers. It must follow the track. Moreover, in case of severe turbulence, there is no way for the cart to become airborne. The wheels are restrained by the track and are unable to move upward. In this way, the carts no longer pose a threat to the passengers or crew.

In one embodiment, the system has a cart release mechanism to remove it from the tracks for servicing and storage. The system uses a "pop-up" ramp that is embedded in the bottom of the track at specific locations. At these locations, the top of the track is large enough to allow the wheels to pass out of the track. Thus, to remove the cart, the ramps are deployed and the cart is pushed up the ramps until all four wheels have come out of the track.

DETAILED DESCRIPTION OF THE INVENTION

Figure 1:
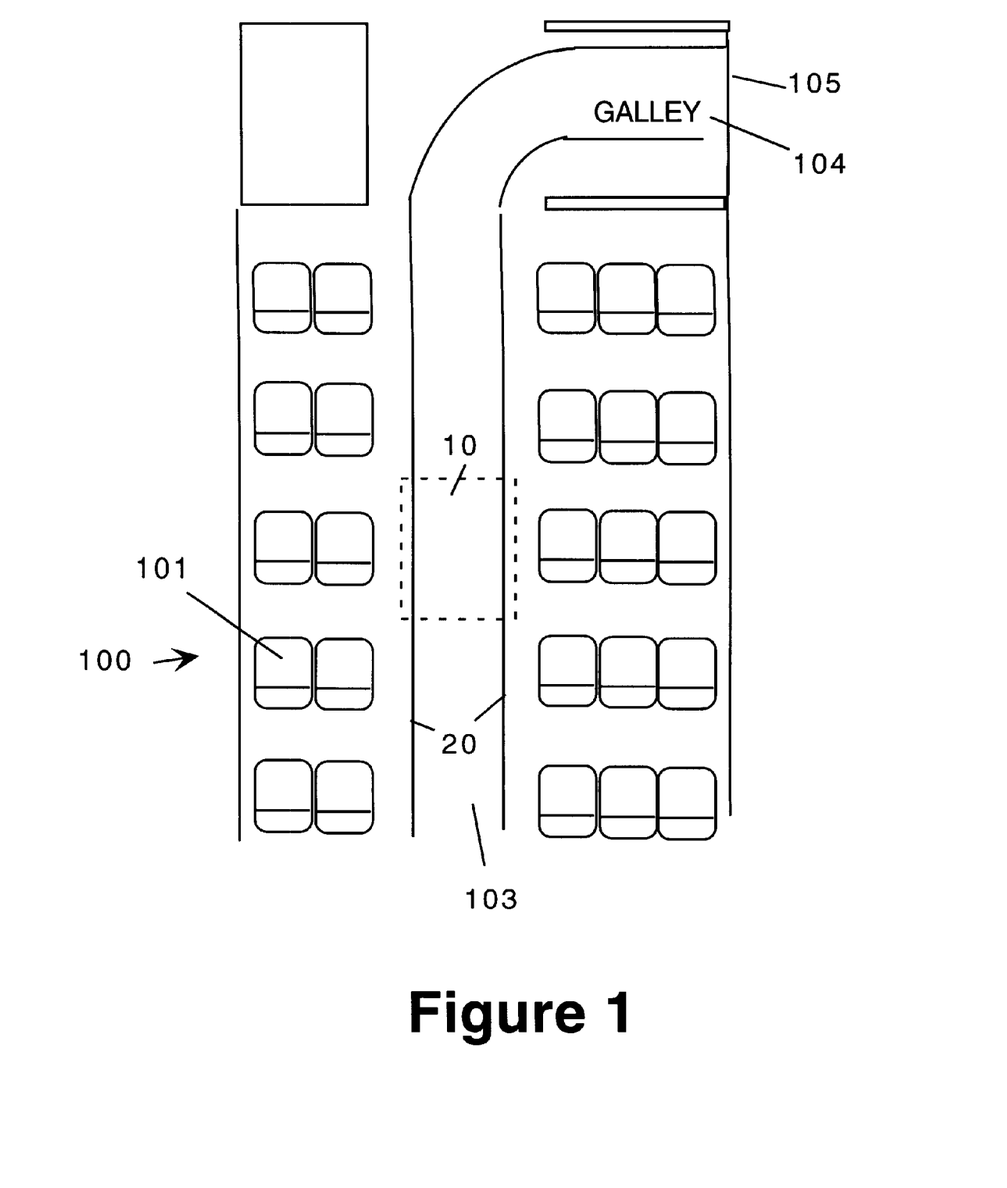
FIG. 1 is a partial plan view of an aircraft cabin showing the track system for serving carts.

Referring now to FIG. 1, a plan view of a typical airliner is shown. The plane 100 has a number of seats 101 arranged as shown. The plan also has an aisle 103 that runs between the rows of seats. The aisle is normally used for traffic around the plane. Today, the aisle is also used for serving drinks and food. Normally, serving carts 10 are pushed up and down the aisle by flight attendants during the flight. The carts 10 are mounted on wheels that make movement of the carts easy. To ensure that the carts remain safe and under control, two tracks 20 are placed in the aisle as shown. The tracks run the length of the cabin and have a curve to position the cart in the galley 104 as shown. In the preferred embodiment, the cart is designed to remain in the tracks at all times. This eliminates the possibility of the cart of becoming airborne in turbulence. It also ensures that the cart remains upright at all times.

As shown in FIG. 1, the tracks run to the end of the galley wall. Here, a service door 105 is provided to allow the carts to be removed for servicing and for new carts to be loaded. The carts are loaded into the tracks immediately when they enter the aircraft and, as noted above, remain there for the entire trip.

Figure 2:
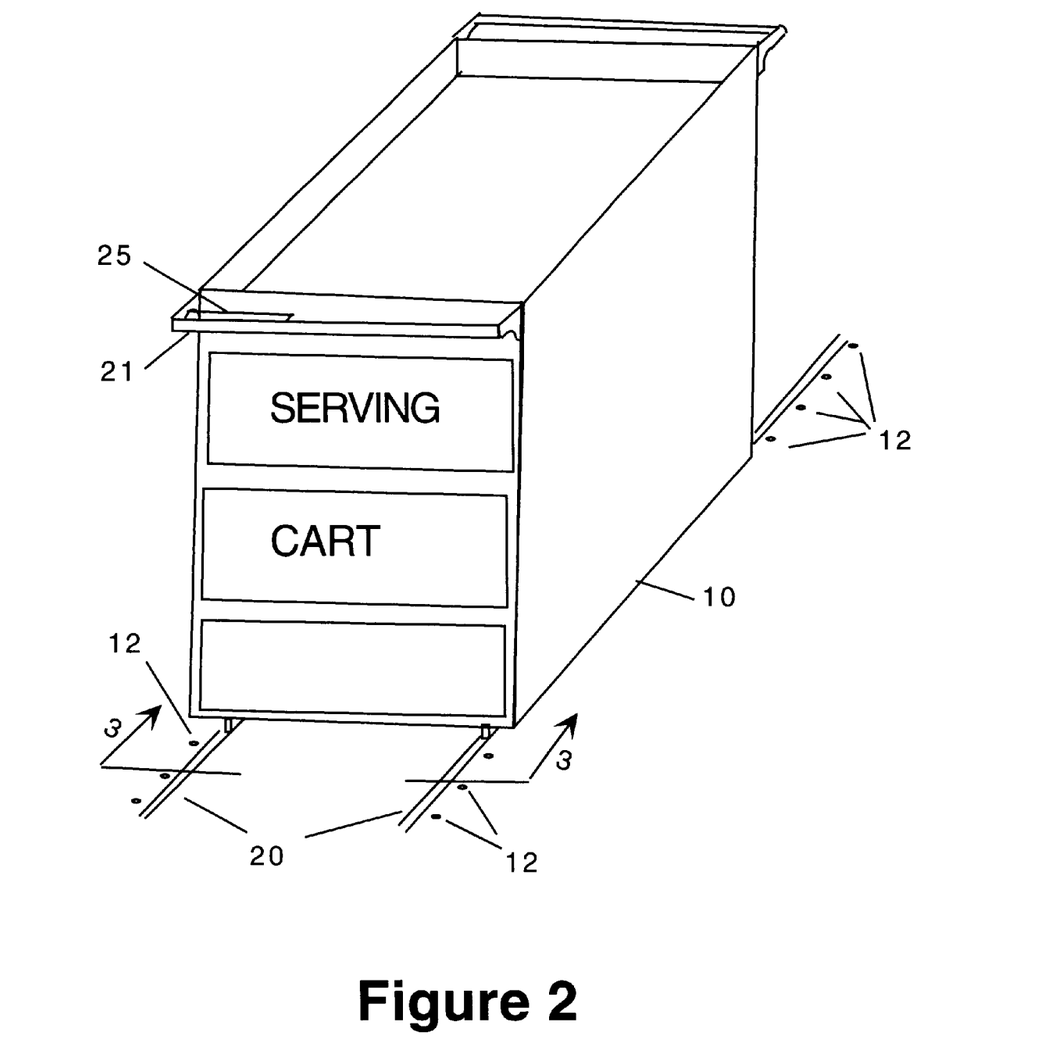
FIG. 2 is a detail perspective view of a serving cart in the tracks.

FIG. 2 is a perspective view of the serving cart 10 positioned in the tracks 20. Note that next to each track is a series of small holes 12. These holes 12 are used for a releasable locking bar, which secures the cart in a fixed position for serving. The operating handle 25 is shown at the top of the cart 10 near the handle 21.

Figure 3:
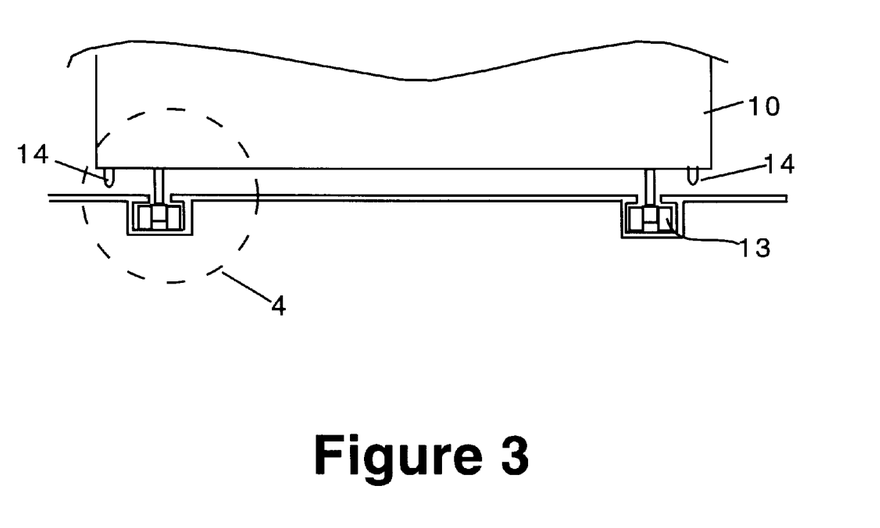
FIG. 3 is a detail of the lower portion of a serving cart showing the wheels mounted in the tracks and the locking tab in the retracted position.
Figure 4:
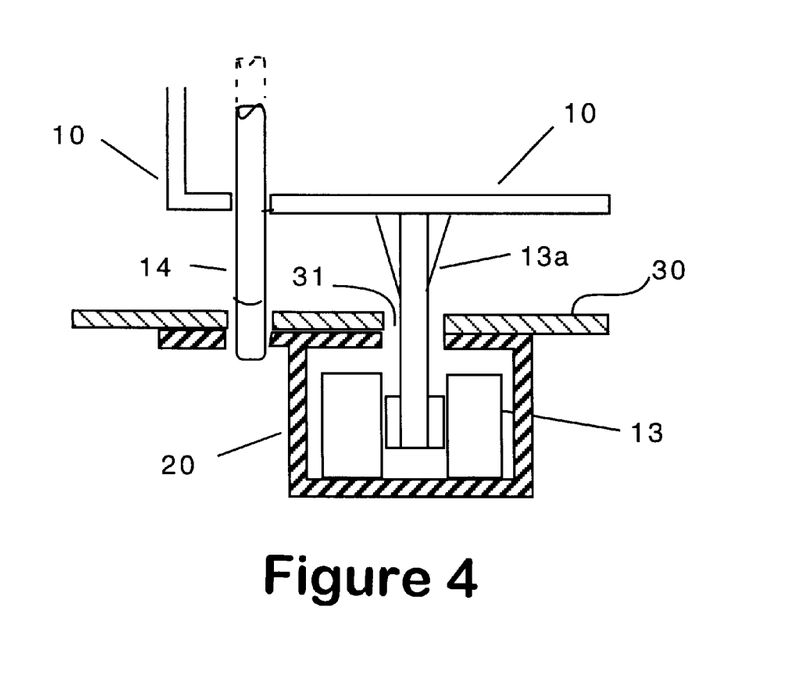
FIG. 4 is a detail view of a portion of FIG. 3, showing the locking tab in the locked position.

FIGS. 3 and 4 show a front view of the bottom of a cart 10. Two wheels 13 are attached to the bottom of the cart as shown. At the side of the cart 10, are two locking pins 14. These pins are designed to fit in the holes 12 to secure the cart in position for serving. FIG. 4 shows enlarged details of the wheels and locking pins. The locking pin 14 shown in FIG. 4 is shown in the locked position. The dashed line shows the position of the pin when it is retracted. Note that FIG. 4 also shows details of the track 20. As shown, the tracks 20 lie under the floor 30. A slot 31 is positioned above the track to allow the wheel leg 13a to rise above the floor as shown. The wheels 13 are wider than the slot. This prevents the cart from leaving the track under normal operation. This makes the cart totally safe in turbulence as it cannot become airborne or tip over.

Figure 5:
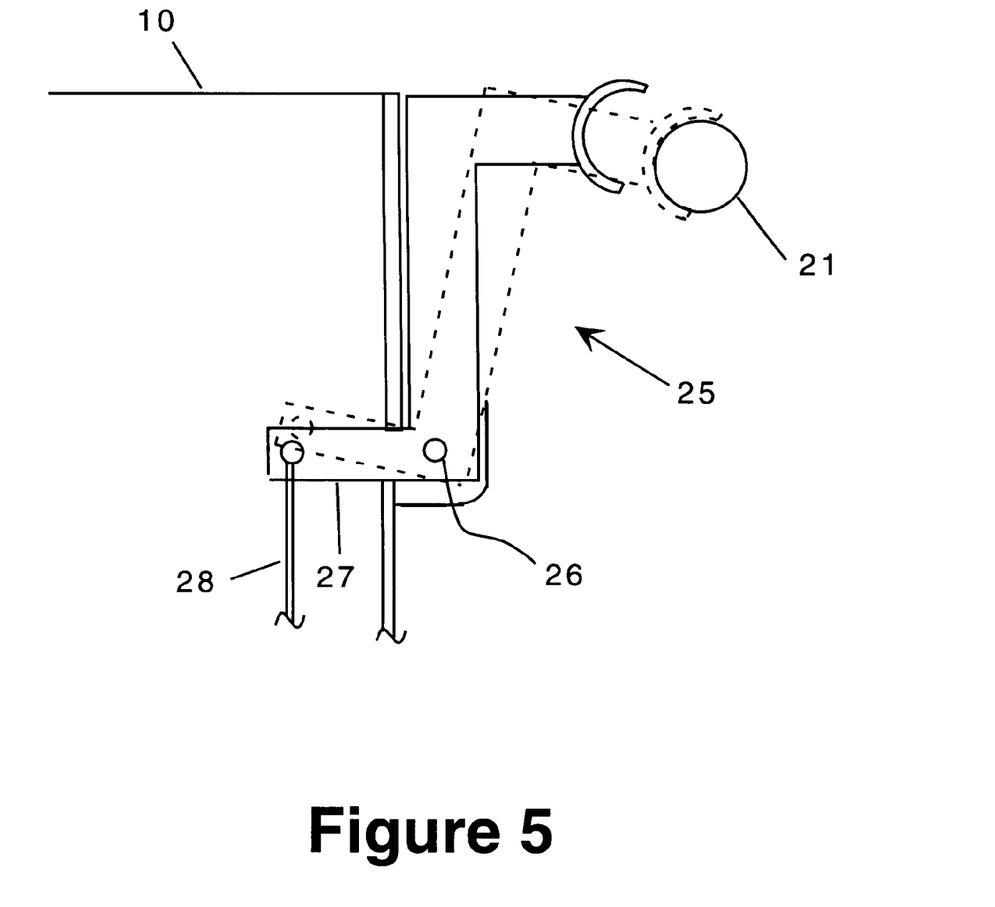
FIG. 5 is a side detail view of the operating lever for the locking tab.

FIG. 5 is a side detail view of the locking handle 25. The handle 25 is positioned on one end of the cart 10 as shown. It is mounted to the cart at a pivot point 26. An engagement arm 27 extends from the pivot point as shown. The handle 25 is shown in solid line in the locked position. In the position, the handle 25 is pushed forward. This causes the locking rod 28 to be pushed downward, which in turn pushes the locking pin 14 down. To release the cart, the handle 25 is pulled back until it rests against the handle 21 as shown. This is shown in the dotted lines in FIG. 5. In this position, the locking rod 28 is raised, which in turn, lifts the locking pin, this then releases the cart 10.

The system shown in FIGS. 1–5 is the preferred embodiment. This embodiment is preferred because it allows the cart to remain in the tracks at all times. This maximizes the safety of the carts.

Although the design of FIGS. 1–5 is preferred, an alternate design is also possible. In this design, the tracks are provided with door ramps so that the carts can be lifted from the tracks. Such a system could be use din conventional aircraft where the galley storage is perpendicular to the cart tracks as shown in FIG. 1. In this case, there must be a simple way to install the carts in the tracks for use and to remove them from the tracks for storage.

Figure 6:
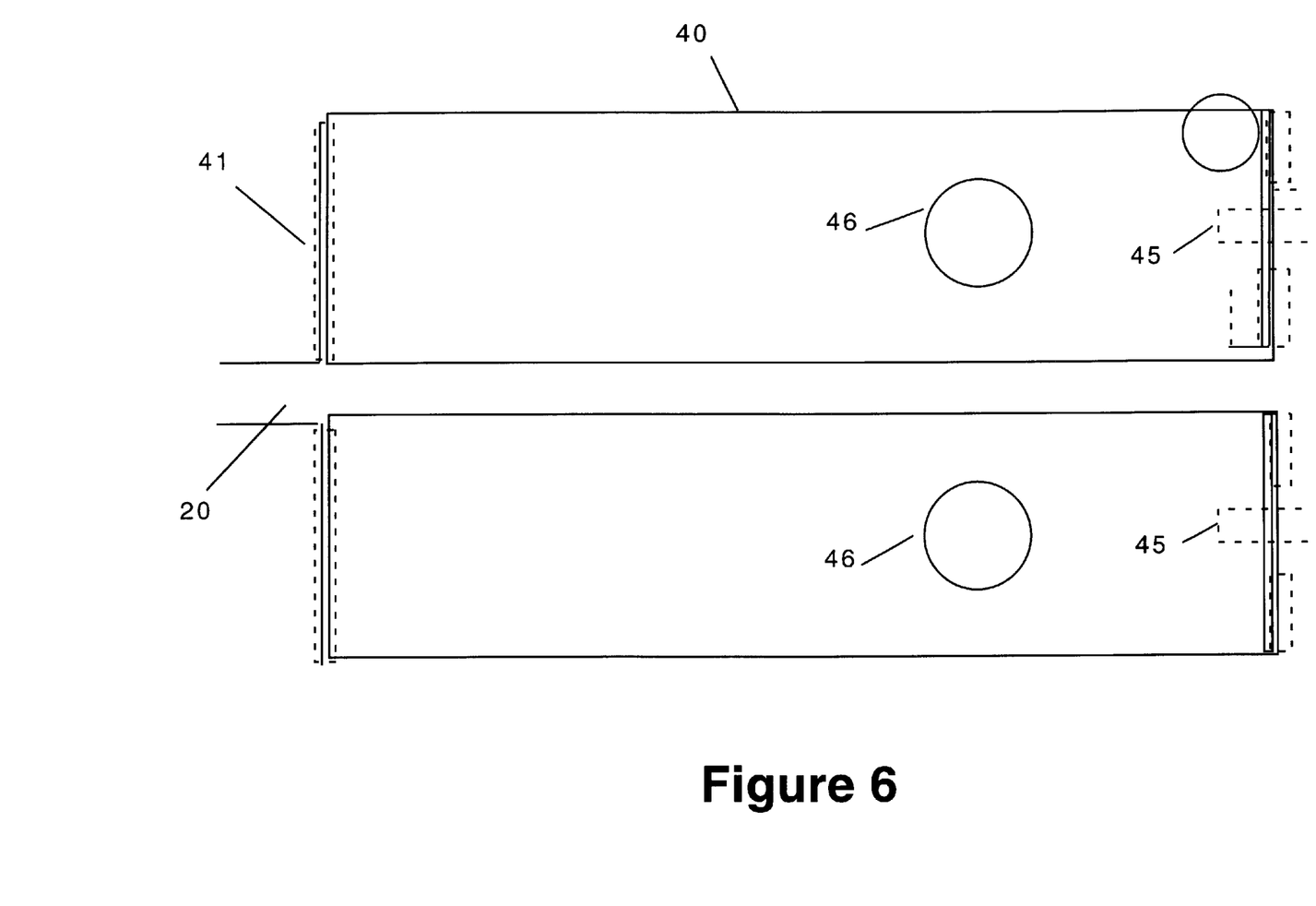
FIG. 6 is a top view of a track ramp used to remove carts from the track in an alternative embodiment.

Referring now to FIG. 6, a plan view of the door ramp 40 is shown. The door ramp 40 is positioned above the track 20 as shown. At one end of the door ramp 40 is a hinge 41. This allows the door to be angled into the track to allow for cart installation or removal as discussed below. T the other end of the door ramp 40 is a pair of latches 45. These latches are used to secure the door ramps in an upright, flat position. Note also two finger holes 46 that are used to pull up the door ramp from its angled position to its closed position.

Figure 7:
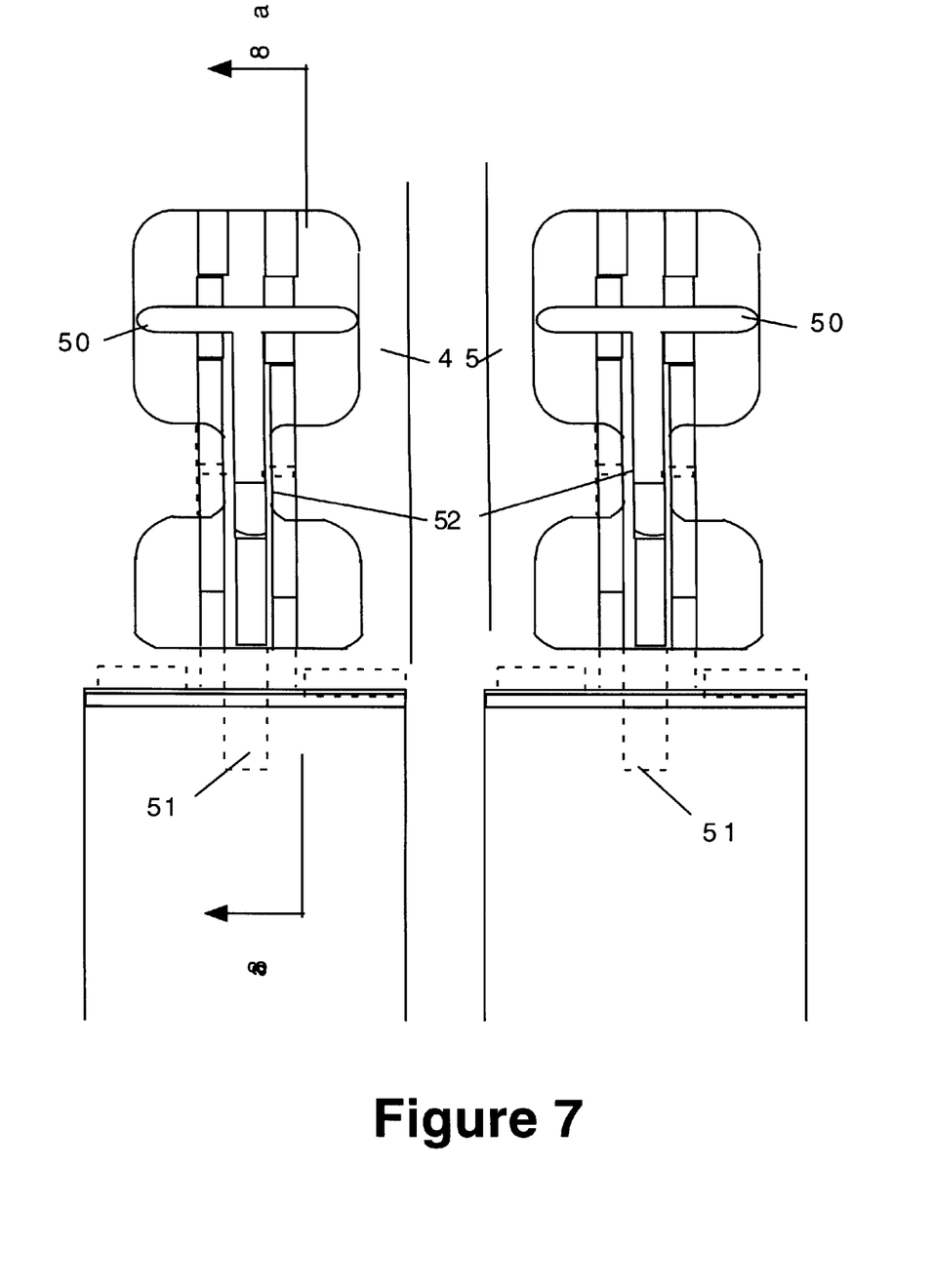
FIG. 7 is a top detail view of latches used to hold the track ramp of the alternative embodiment upright and to release the track ramp when removal of the carts is desired.

FIG. 7 is a plan view of the two latches 45. At the door end of the latches are two catches 51, which are shown in more detail in FIGS. 8A and 10. Each latch 45 has a "T" handle 50. That is used to release the catches. The "T" handles 50 pivot on a pin 52.

Figure 8A:
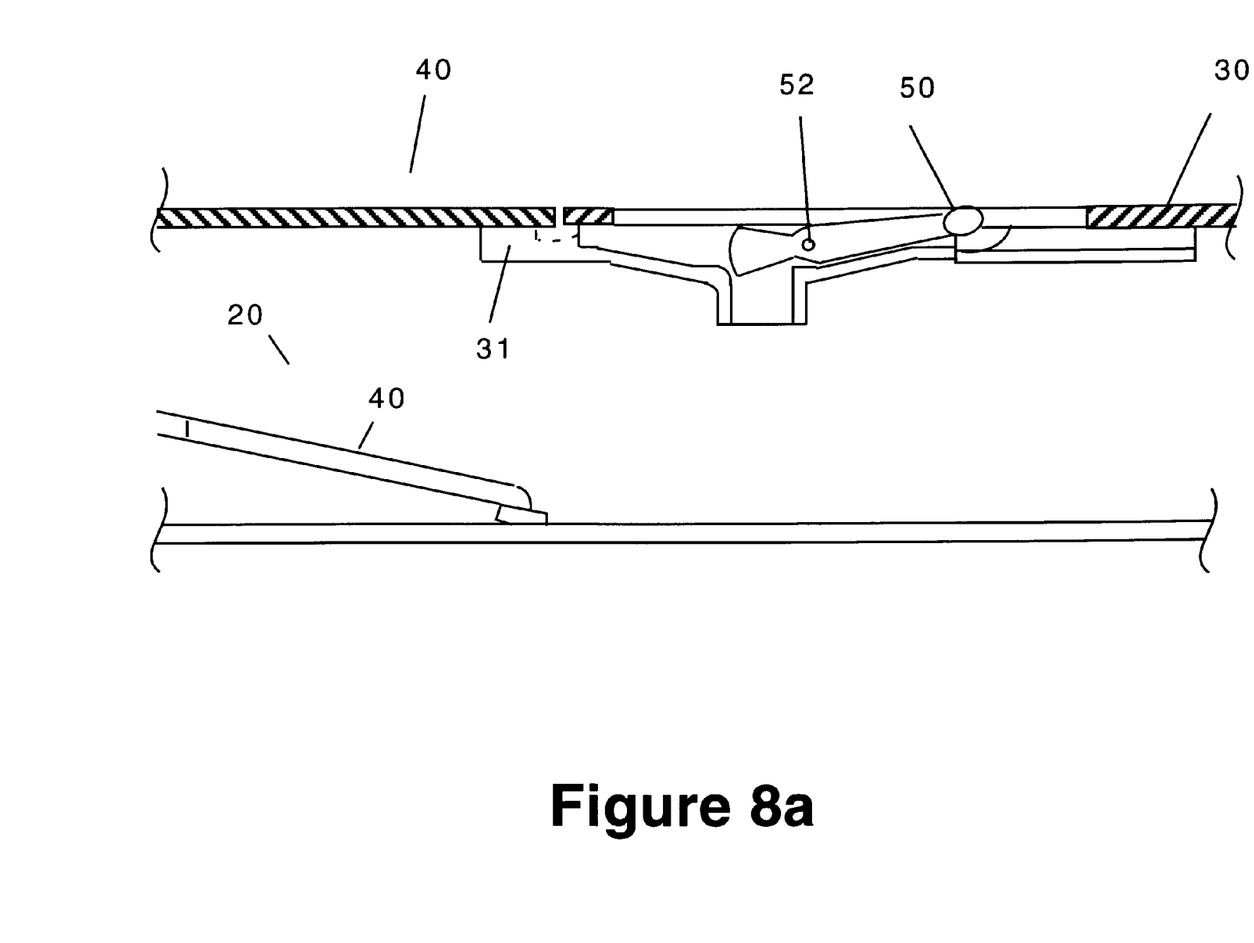
FIG. 8A is a side cross-sectional view of the latch for the track ramp of the alternative embodiment.
Figure 8B:
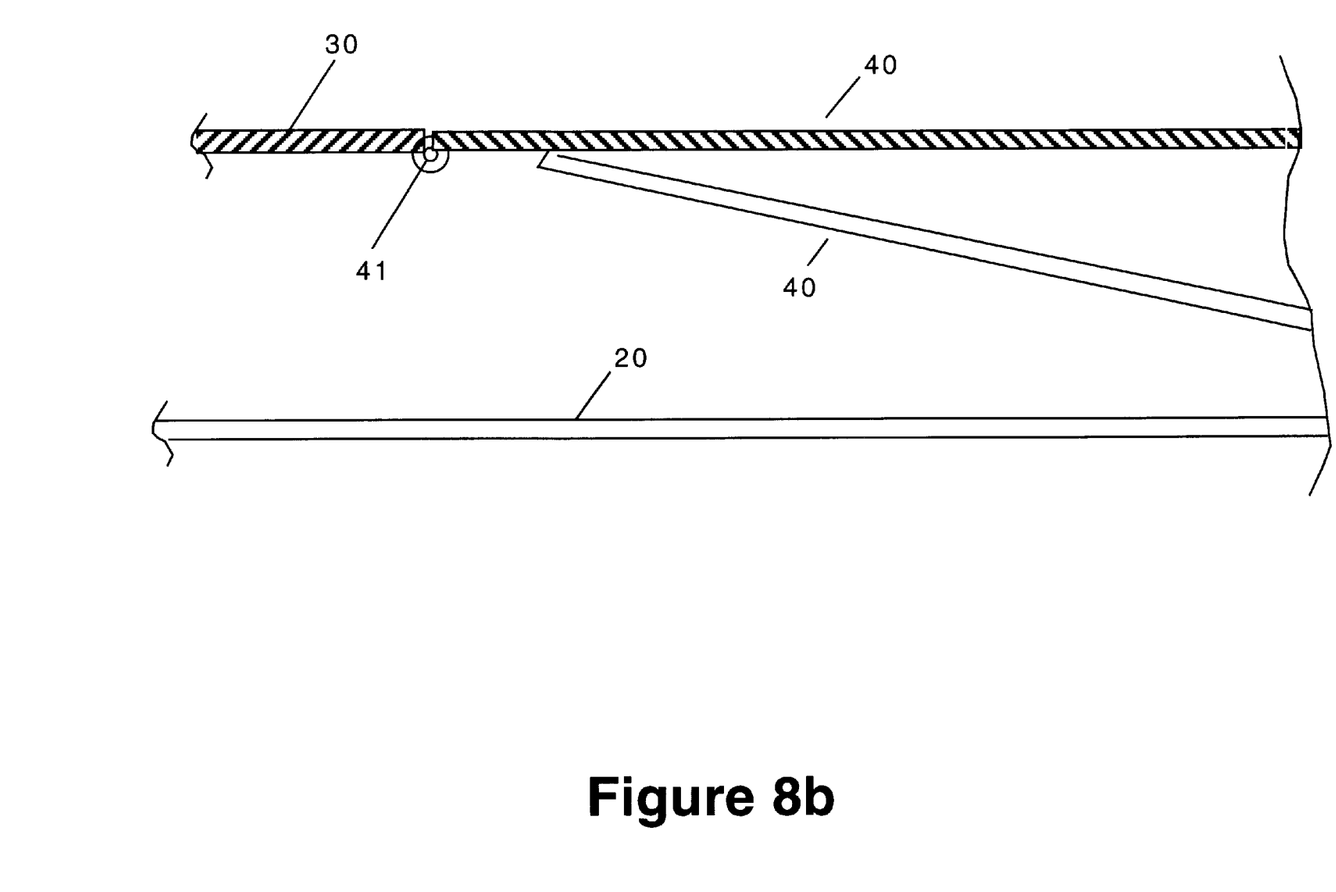
FIG. 8B is a side cross-sectional view of the track ramp of the alternative embodiment, shown in both the upright position and the lowered position.

FIG. 8A shows a side view of the track 20. The door hatch 40 is shown upright and closed in the hatched line. The latch 45 is shown in the closed position. The "T" handle 50 is shown flat. Pivot point 51 is also shown. Finally, catch 51 is shown supporting the door ramp. This figure also shows a partial view of the door ramp 40 in the operating position. FIG. 8B shows a portion of the door ramp 40 in the upright position (hatched lines). It also shows the door ramp in the angled operating position. Hinge 41 is shown attached to the floor 30. The bottom of the track 20 is also shown.

Figure 9:
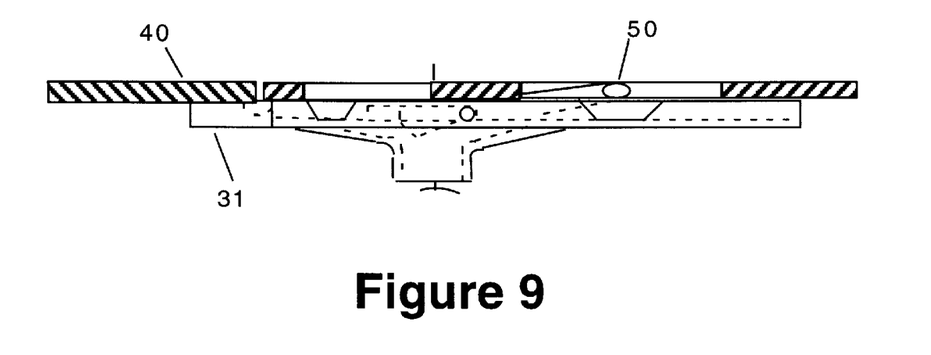
FIG. 9 is a detail cross-sectional view of the latch mechanism of the alternative embodiment.
Figure 10:
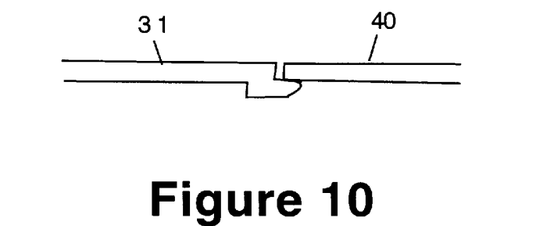
FIG. 10 is a detail view of the latch that holds the track ramp upright in the alternative embodiment.

FIG. 9 shows a side view of the latch and the catch holding the door ramp. FIG. 10 shows the catch and the door ramp. When the "T" handle is lifted it slides the catch back in the direction o the arrow, this releases the door ramp so that it can drop into the track as shown in FIGS. 8A and 8B.

Figure 11:
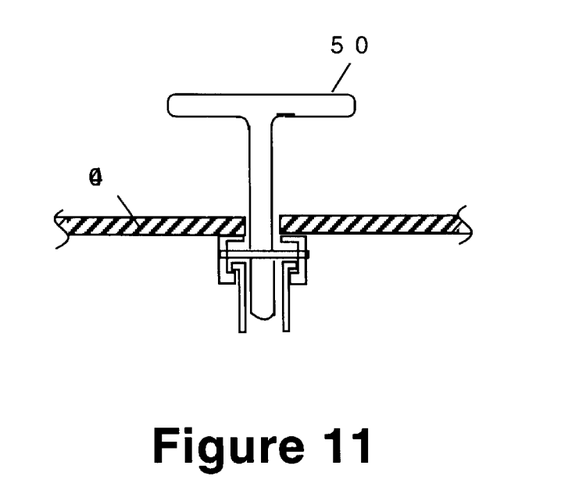
FIG. 11 is a front detail view of the latch in the raised position, in the alternative embodiment.

FIG. 11 shows the "T" handle in the raised position. In this position, the catch is released from the door ramp.

T use this system, the cart is placed ahead of the door ramp. The door ramps are lowered in the angled positions. The cart can then be moved down the ramp until both sets of wheels are secure in the track. The door ramps can then be lifted and secured in place. Now the cart is ready to use as in the first embodiment. To remove the cart from the tracks, the reverse procedure is followed.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for controlling the movement of airplane service carts in an airplane having a floor comprising:
    a) a pair of parallel tracks placed in the floor of said airplane;
    b) a serving cart, said serving cart having a plurality of wheels assemblies attached thereto, each of said plurality of wheel assemblies having an extended bracket portion extending upwardly therefrom and a wheel and further wherein each of said wheels of said plurality of wheel assemblies has a width, and wherein each of said extended bracket portions has a width, and wherein said width of each of said wheels is substantially wider than the width of each of said extended bracket portions; and
    c) wherein said plurality of wheel assembles also being position in said pair of parallel tracks such that the extended bracket portion on each of said plurality of wheel assemblies extends above said pair of parallel tracks.

2. The device of claim 1 further comprising a means for securing said serving cart in a temporarily fixed position.

3. The device of claim 2 where in the means for securing said serving cart comprise:
    a) at least one locking pin, slidably attached to said serving cart;
    b) a plurality of holes, formed in said pair of parallel tracks for receiving the at least one locking pin; and
    c) a means for raising and lowering said at least one locking pin to secure said pin in at least one of said plurality of holes in said pair of parallel tracks.

4. The device of claim 3 wherein said means for raising and lowering said locking pin comprises an operating lever.

5. The device of claim 1 further comprising a means for removing said serving cart from said pair of parallel tracks.

6. The device of claim 5 wherein said pair of parallel tracks has an end, and further wherein said means for removing said serving cart comprise an open portion of track at the end of said pair of parallel tracks.

7. The device of claim 5 wherein said means for removing said serving cart comprise:
    a) a pair of hinged doors, installed in said floor of said airplane and being aligned with said pair of parallel tracks;
    b) a pair of latches to secure said pair of hinged doors;
    c) whereby, when said pair of latches is released, said pair of hinged doors fall into said pair of parallel track forming an angled ramp.

8. The device of claim 7 further comprising a means for raising said pair of doors to a closed position.

9. The device of claim 1 wherein each of said pair of parallel tracks has a top, and further, wherein said top of each of said pair of parallel tracks has an open slot formed therein, and further wherein each open slot has a width substantially narrower than the width of each of said wheels in each of said plurality of wheels assemblies.

10. A device for controlling movement of airplane service carts in an airplane having a floor comprising:
    a) a pair of parallel tracks placed in the floor of said airplane, wherein each of said pair of parallel tracks has a top, and further, wherein each top of said pair of parallel tracks has an open slot formed therein;

b) a serving cart, said serving cart having a plurality of wheels assemblies attached thereto, each of said plurality of wheel assemblies having an extended bracket portion extending upwardly therefrom and a wheel, and further wherein each extended bracket portion and each wheel has a width, and wherein the width of each wheel is substantially wider than the width of each extended bracket portion;

c) wherein each open slot in the top of said pair of parallel tracks has a width substantially narrower than the width of each wheel;

d) wherein said plurality of wheel assembles also being positioned in said pair of parallel tracks such that each extended bracket portion extends above said pair of parallel tracks;

e) a means for securing said serving cart in a temporarily fixed position; and f) a means for removing said serving cart from said pair of parallel tracks.

11. The device of claim 10 where in the means for securing said serving cart comprise:

a) at least one locking pin, slidably attached to said serving cart;

b) a plurality of holes, formed in said pair of parallel tracks for receiving the at least one locking pin; and c) a means for raising and lowering said at least one locking pin to secure said at least one locking pin in at least one of said plurality of holes in said pair of parallel tracks.

12. The device of claim 11 wherein said means for raising and lowering said locking pin comprises an operating lever.

13. The device of claim 10 wherein said pair of parallel tracks has an end, and further wherein said means for removing said serving cart comprise an open portion of track at the end of said pair of parallel tracks.

14. The device of claim 10 wherein said means for removing said serving cart comprise:

a) a pair of hinged doors, installed in said floor of said airplane and being aligned with said pair of parallel tracks;

b) a pair of latches to secure said pair of hinged doors;

c) whereby, when said pair of latches is released, said pair of hinged doors fall into said pair of parallel track forming an angled ramp.

15. The device of claim 14 further comprising a means for raising said pair of doors to a closed position.

* * * * *